United States Patent
Park et al.

(10) Patent No.: US 7,894,966 B2
(45) Date of Patent: Feb. 22, 2011

(54) SYSTEM AND METHOD OF CONTROLLING AN UPSHIFT IN AUTOMATIC TRANSMISSION

(75) Inventors: Cheol Park, Anyang-Si (KR); Osamu Sato, Fujisawa (JP)

(73) Assignee: JATCO Ltd, Fuji (JP)

( * ) Notice: Subject to any disclaimer, the term of this patent is extended or adjusted under 35 U.S.C. 154(b) by 773 days.

(21) Appl. No.: 11/931,817

(22) Filed: Oct. 31, 2007

(65) Prior Publication Data

US 2008/0300104 A1    Dec. 4, 2008

(30) Foreign Application Priority Data

Nov. 8, 2006    (JP) .............................. 2006-302175

(51) Int. Cl.
    *B60W 10/02*    (2006.01)
(52) U.S. Cl. .............................. 701/59; 701/55; 701/66
(58) Field of Classification Search .................. 701/51, 701/54, 55, 60, 61, 64, 66; 477/68, 69, 80
    See application file for complete search history.

(56) References Cited

U.S. PATENT DOCUMENTS 6,041,275 A    3/2000    Takiguchi 6,684,144 B2 *    1/2004    Sekii et al. ..................... 701/51
7,500,932 B2 *    3/2009    Katakura et al. ............ 475/123

FOREIGN PATENT DOCUMENTS

JP    7-012209 A    1/1995
JP    10-184882 A    7/1998

* cited by examiner

*Primary Examiner*—Richard M. Camby
(74) *Attorney, Agent, or Firm*—Foley & Lardner LLP

(57) ABSTRACT

An upshift control system for use in an automatic transmission including first and second friction elements, the upshift control system including a control unit that determines variation in an engagement capacity of the first friction element or an engagement capacity of the second friction element on the basis of combination of occurrence or non-occurrence of engine racing and compared lengths between a first time that elapses from output of a shift command to a start of an inertia phase and a second time that elapses from the out output of a shift command to a start of change in an actual gear ratio toward a target gear ratio to be achieved after the shifting, and performs a learning correction of a command pressure for the first friction element or a command pressure for the second friction element on the basis of the determination result.

25 Claims, 7 Drawing Sheets

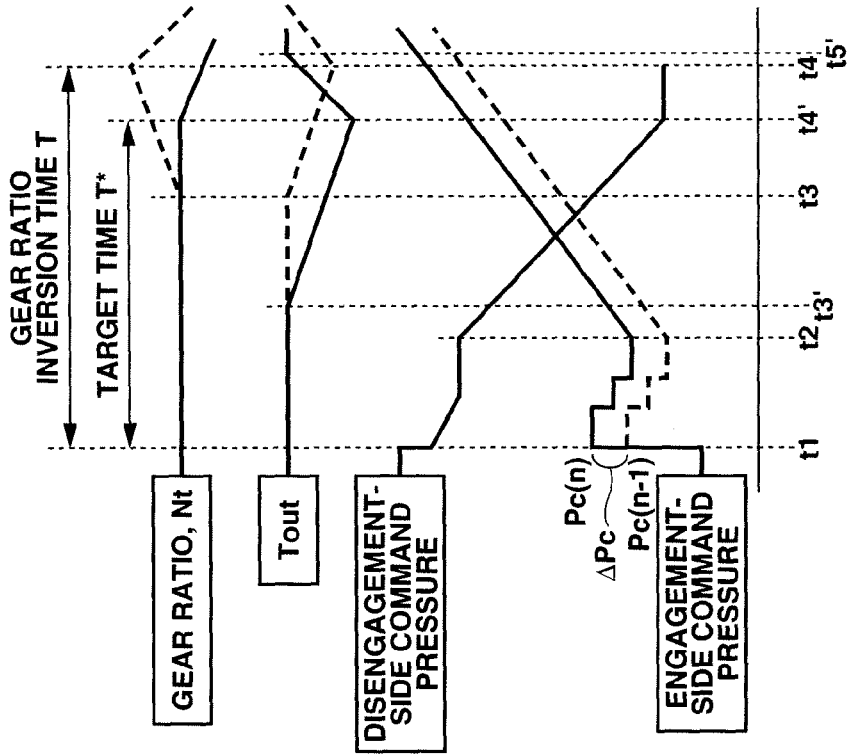
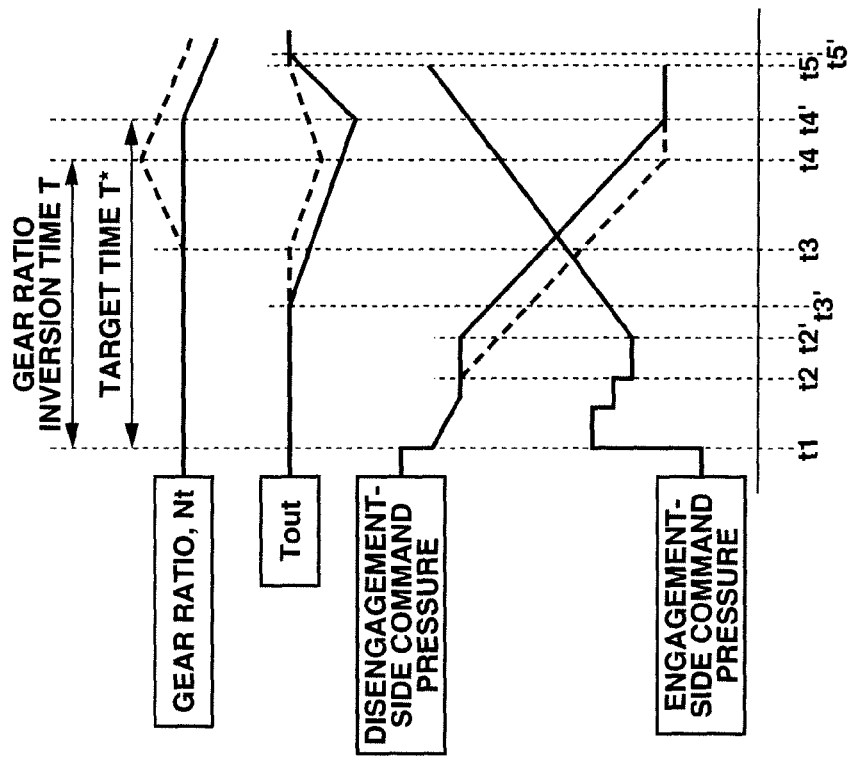

INTERLOCK: GEAR RATIO
INVERSION TIME ≤ TARGET TIME
→ DETERMINE OCCURRENCE OF VARIATION IN
ENGAGEMENT-SIDE COMMAND PRESSURE

INTERLOCK: GEAR RATIO
INVERSION TIME > TARGET TIME
→ DETERMINE OCCURRENCE OF VARIATION IN
DISENGAGEMENT-SIDE COMMAND PRESSURE

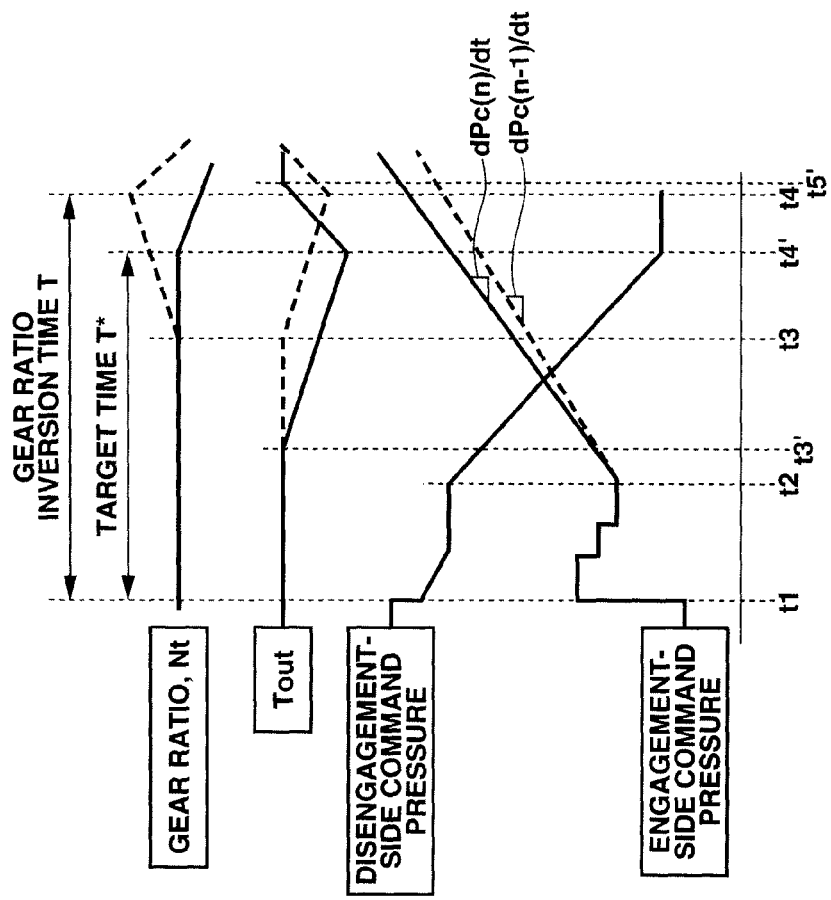
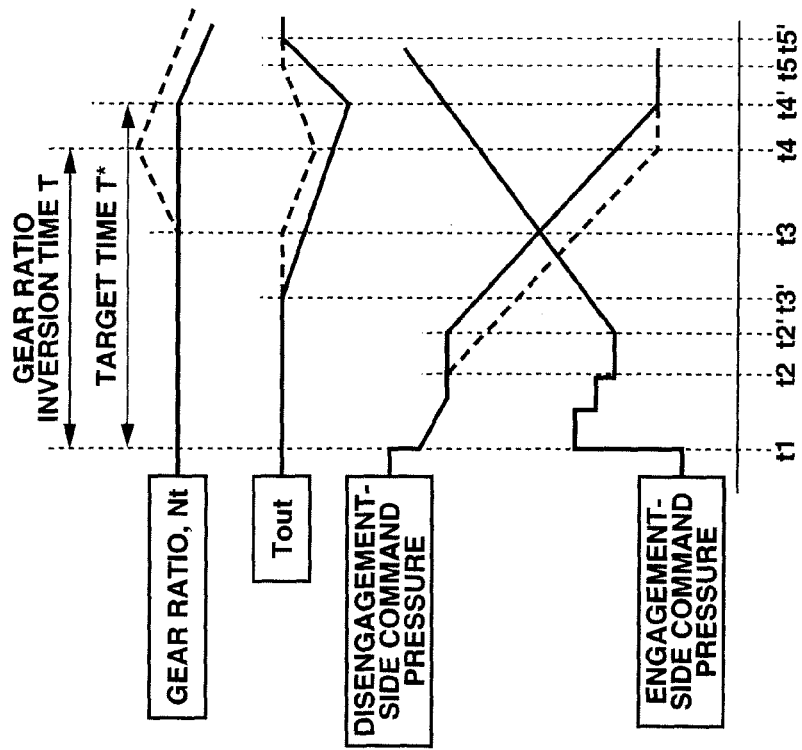

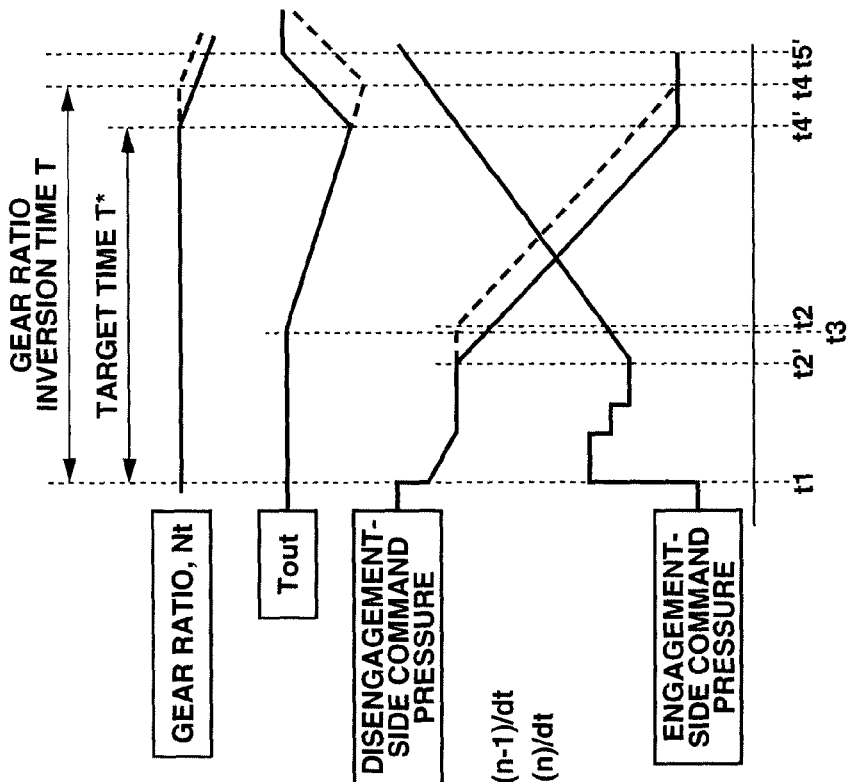
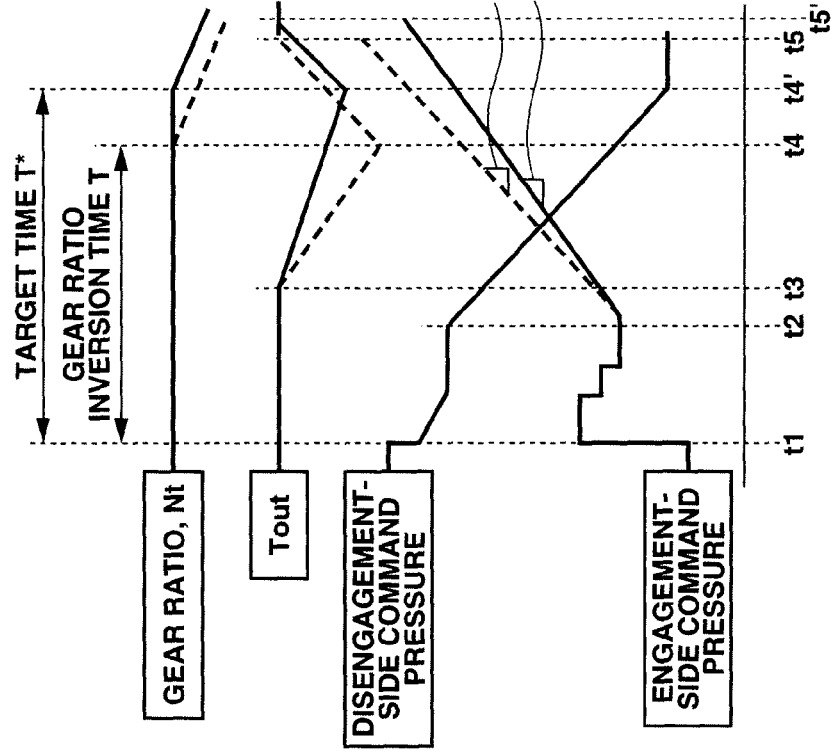

SYSTEM AND METHOD OF CONTROLLING AN UPSHIFT IN AUTOMATIC TRANSMISSION

BACKGROUND OF THE INVENTION

The present invention relates to an upshift control system for an automatic transmission.

There have been conventionally proposed upshift control systems for an automatic transmission. Japanese Patent Application First Publication No. 10-184882 (corresponding to U.S. Pat. No. 6,041,275) discloses an upshift control system for an automatic transmission which performs learning control of shift (changeover) timing for friction elements in the automatic transmission in order to provide a good shift feeling upon an upshift operation. In this conventional system, when engine racing is detected in a range in which an engagement pressure in an engagement-side (apply-side) friction element is larger than an engagement pressure in a disengagement-side (release-side) friction element, it is determined that the engine racing is caused due to lack of an engagement capacity of the engagement-side friction element, and therefore, the engagement pressure in the engagement-side friction element is allowed to increase. Further, when engine racing is detected in a range in which the engagement pressure in the disengagement-side friction element is larger than the engagement pressure in the engagement-side friction element, it is determined that the engine racing is caused due to lack of an engagement capacity of the disengagement-side friction element, and therefore, the engagement pressure in the disengagement-side friction element is allowed to increase.

Japanese Patent Application First Publication No. 7-12209 discloses a shift control system for an automatic transmission which aims to suppress engine racing or shock due to torque drop during a torque phase of upshift. The shift control system is adapted to optimally control timing of shift (changeover) by using a one-way clutch for the disengagement-side friction element and a hydraulic pressure switch (sensor) for the engagement-side friction element.

SUMMARY OF THE INVENTION

However, in the upshift control system of Japanese Patent Application First Publication No. 10-184882, the cause of engine racing is determined on the basis of only magnitude comparison between the engagement pressure in the engagement-side friction element and the engagement pressure in the disengagement-side friction element. Therefore, it is not possible to directly detect lack of the engagement capacity of the friction element which is caused due to deterioration of friction coefficient μ. Actual engagement capacity of the friction element is given by the following formula: engagement capacity (engaging force)=friction coefficient μ X engagement pressure. Further, even when engine racing is detected in the range in which the engagement pressure in the engagement-side friction element is larger than the engagement pressure in the disengagement-side friction element, the cause of the engine racing would not usually be the lack of the engagement capacity of the engagement-side friction element and might be the lack of the engagement capacity of the disengagement-side friction element. That is, it cannot be considered that the determination of the cause of engine racing in the above-described conventional art is accurate. Even if the learning control is conducted on the basis of the determination of the cause of engine racing as described in the conventional art, the shift of the friction elements could not always be carried out at accurate timing.

In the shift control system of Japanese Patent Application First Publication No. 7-12209, the number of friction elements and parts of the system must be increased, whereby it is not possible to reduce the size and weight of the system.

It is an object of the present invention to provide a system and method of controlling an upshift in an automatic transmission, which can accurately determine variation in engagement capacity of a disengagement-side friction element or an engagement-side friction element and carry out a learning control on the basis of the determination of variation in engagement capacity, and thereby can ensure a stable shift feeling and can be reduced in size and weight.

In one aspect of the present invention, there is provided an upshift control system for use in an automatic transmission that is configured to perform shifting of a gear ratio in response to an output of a shift command, the automatic transmission including a first friction element and a second friction element and achieving a target gear ratio by engaging the first friction element and disengaging the second friction element, the upshift control system controlling an engagement capacity of the first friction element and an engagement capacity of the second friction element, the upshift control system comprising:

a gear ratio detecting section that detects an actual gear ratio of the automatic transmission;

an engine racing detecting section that detects occurrence or non-occurrence of engine racing by comparing the actual gear ratio of the automatic transmission with a target gear ratio that is set before the shifting;

a first time setting section that sets a first time as a target time which elapses from the output of the shift command to a start of an inertia phase;

a second time detecting section that detects a second time that elapses from the output of the shift command to a start of change in the actual gear ratio toward a target gear ratio to be achieved after the shifting;

a comparison section that compares lengths between the first time and the second time;

a determination section that determines excess or lack of the engagement capacity of the first friction element or excess or lack of the engagement capacity of the second friction element on the basis of the detected occurrence or non-occurrence of engine racing and the compared lengths between the first time and the second time; and a correction section that performs a learning correction of a command pressure for the first friction element or a command pressure for the second friction element on the basis of the determined excess or lack of the engagement capacity of the first friction element or excess or lack of the engagement capacity of the second friction element.

In a further aspect of the present invention, there is provided an upshift control method for an automatic transmission that is configured to perform shifting of a gear ratio in response to an output of a shift command, the automatic transmission including a first friction element and a second friction element and achieving a target gear ratio by engaging the first friction element and disengaging the second friction element, the upshift control method controlling an engagement capacity of the first friction element and an engagement capacity of the second friction element, the upshift control method comprising:

detecting an actual gear ratio of the automatic transmission;

detecting occurrence or non-occurrence of engine racing by comparing the actual gear ratio of the automatic transmission with a target gear ratio that is set before the shifting;

setting a first time as a target time which elapses from the output of the shift command to start of an inertia phase;

detecting a second time that elapses from the output of the shift command to a start of variation in the actual gear ratio toward a target gear ratio to be achieved after the shifting;

comparing lengths between the first time and the second time;

determining excess or lack of the engagement capacity of the first friction element or excess or lack of the engagement capacity of the second friction element on the basis of the detected occurrence or non-occurrence of engine racing and the compared lengths between the first time and the second time; and performing a learning correction of a command pressure for the first friction element or a command pressure for the second friction element on the basis of the determined excess or lack of the engagement capacity of the first friction element or excess or lack of the engagement capacity of the second friction element.

BRIEF DESCRIPTION OF THE DRAWINGS

FIGS. 4A and 4B are timing charts showing a learning control of the upshift control which is carried out in the upshift control system shown in FIG. 1 when engine racing occurs and the opening of the throttle valve is the extremely small opening.

FIGS. 6A and 6B are timing charts showing a learning control of the upshift control which is carried out when engine racing occurs and the opening of the throttle valve is the small-to-large opening.

FIGS. 7A and 7B are timing charts showing a learning control of the upshift control which is carried out when interlock occurs and the opening of the throttle valve is the small-to-large opening.

DETAILED DESCRIPTION OF THE INVENTION

Figure 1:
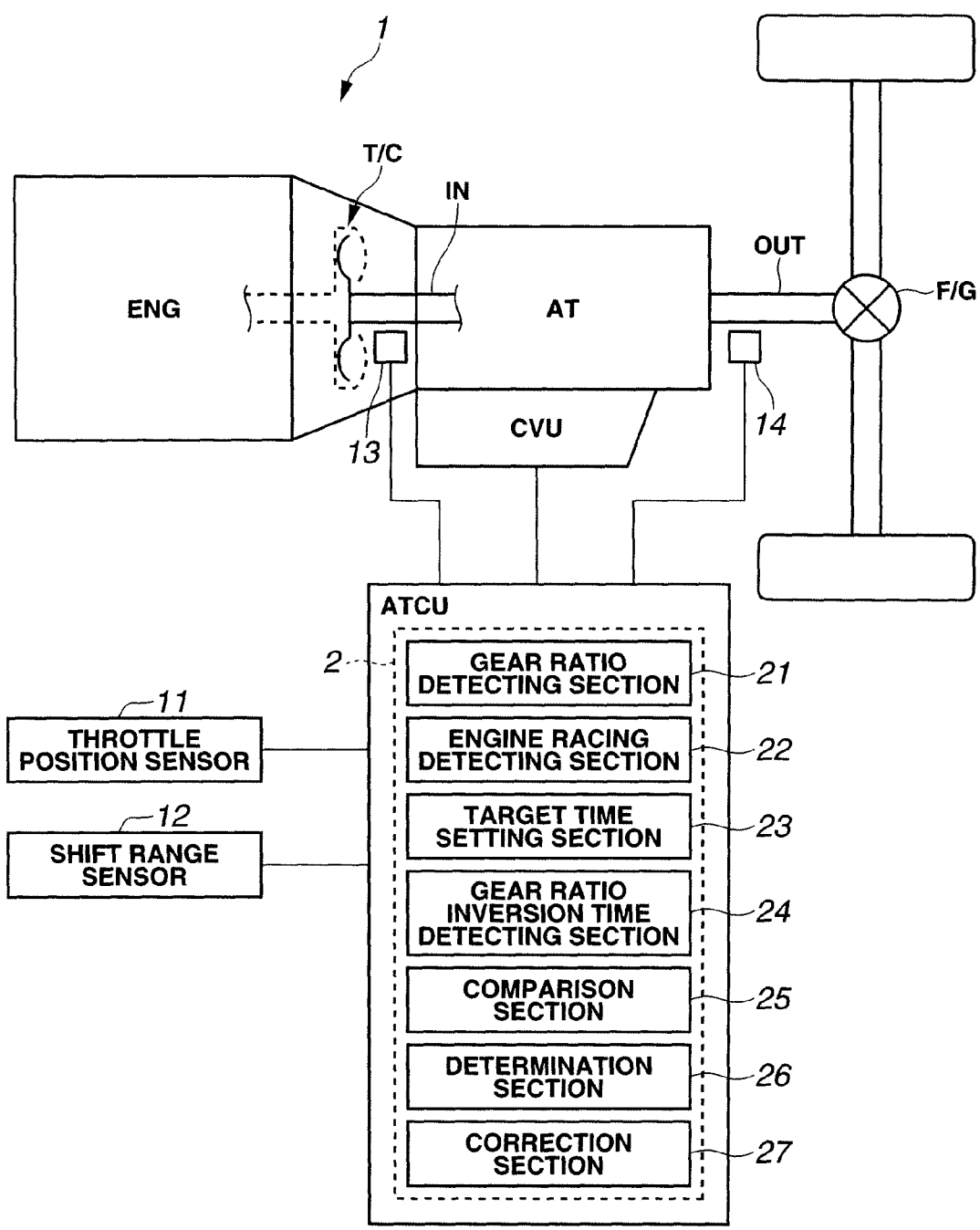
FIG. 1 is a schematic diagram showing a construction of an upshift control system for an automatic transmission, of an embodiment of the present invention.

With reference to the accompanying drawings, an embodiment of an upshift control system and method for an automatic transmission, according to the present invention is explained. FIG. 1 is a schematic diagram showing a construction of the upshift control system of the embodiment which is applied to a drive system of a vehicle.

[Drive System]

As illustrated in FIG. 1, drive system 1 includes engine ENG, automatic transmission AT, automatic transmission controller ATCU and various sensors 11 to 14. Automatic transmission AT is a multiple-speed automatic transmission including, for instance, five forward gears and one reverse gear. Automatic transmission AT includes torque converter T/C, a planetary gear mechanism (not shown) and control valve unit CVU. An output torque of engine ENG is inputted to input shaft IN of automatic transmission AT via torque converter T/C. The planetary gear mechanism changes the rotation inputted through input shaft IN at gear ratio G corresponding to a gear stage selected, and transmits the torque to output shaft OUT of automatic transmission AT. The torque of output shaft OUT is transmitted to driving wheels via final drive gear F/G and differential.

[Hydraulic Circuit]

The planetary gear mechanism includes a plurality of friction elements and establishes a desired gear ratio GR, i.e., gear stage, in combination of engagement (apply) and disengagement (release) of the friction elements. Control valve unit CVU includes a hydraulic circuit for controlling engagement and disengagement of the friction elements. The hydraulic circuit includes a plurality of hydraulic control valves corresponding to the friction elements. Automatic transmission controller ATCU transmits a command signal to the hydraulic control valves and controls opening and closing operation of the hydraulic control valves to thereby control a hydraulic pressure that is supplied to the friction elements. The friction elements are brought into an engagement state when an engagement pressure is supplied to an engaging piston chamber, and are brought into a disengagement state when the engagement pressure is drained from the engaging piston chamber.

The hydraulic control valves are direct-operated valves which are provided corresponding to the friction elements, respectively. The hydraulic control valves are constructed to independently control the engagement pressure for an engagement-side friction element and the engagement pressure for a disengagement-side friction element upon shifting. The hydraulic control valves are not limited to the direct-operated valves and may be in the form of a shift valve and the like.

Various sensors 11-14 include throttle position sensor 11 for sensing a throttle opening of a throttle valve, shift range sensor 12 for sensing a shift range or a gear stage which is selected by a vehicle driver, turbine rotation sensor 13 for sensing a rotational speed of input shaft IN of automatic transmission AT, i.e., rotational number Nt of a turbine shaft of torque converter T/C, and output rotation sensor 14 for sensing rotational speed No of output shaft OUT of automatic transmission AT.

[Automatic Transmission Controller]

Automatic transmission controller ATCU receives sensing signals from throttle position sensor 11, shift range sensor 12, turbine rotation sensor 13 and output rotation sensor 14, and carries out computing on the basis of the sensing signals. For instance, automatic transmission controller ATCU calculates a vehicle speed on the basis of rotational speed No of output shaft OUT which is sensed by output rotation sensor 14.

Further, automatic transmission controller ATCU performs shift control. Specifically, first, automatic transmission controller ATCU determines a target gear stage (target gear ratio GR*) by referring to a shift schedule that is previously set and stored in automatic transmission controller ATCU, on the basis of the vehicle speed signal and the throttle position signal. Secondarily, automatic transmission controller ATCU outputs a shift command signal to control valve unit CVU and achieves shifting to the target gear stage by controlling engagement and disengagement of the friction elements with hydraulic pressure.

Automatic transmission controller ATCU includes upshift control unit 2 (referred to simply as control unit 2 hereinafter) as an electronic control unit. Control unit 2 performs a learning control of timing of changeover of the friction elements in order to provide good shift feeling upon conducting an upshift by the changeover of the friction elements. Control unit 2 includes gear ratio detecting section 21, engine racing detecting section 22, target time setting section 23, gear ratio inversion time detecting section 24, comparison section 25, determination section 26 and correction section 27. Control unit 2 includes an input/output device, a storage device incorporating a plurality of control programs such as a nonvolatile RAM and a ROM, a central processing unit (CPU), and a timer counter, not shown.

Gear ratio detecting section 21 detects actual gear ratio GR by dividing turbine rotational number Nt sensed by turbine rotation sensor 13 by output rotational number No sensed by output rotation sensor 14.

Engine racing detecting section 22 detects occurrence or non-occurrence of engine racing by comparing actual gear ratio GR with target gear ratio GR*(n−1) that is set before shifting. When actual gear ratio GR has become larger than target gear ratio GR*(n−1) with increase in turbine rotational number Nt, engine racing detecting section 22 detects the occurrence of the engine racing. The term "shift" that is referred to hereinafter in this embodiment means upshift.

Target time setting section 23 sets target time T* that elapses from the time at which the shift command is outputted to the time at which an inertia phase starts. In this embodiment, experiments are carried out to thereby obtain the engagement pressure in the engagement-side friction element (referred to simply as the engagement-side engagement pressure hereinafter) and the engagement pressure in the disengagement-side friction element (referred to simply as the disengagement-side engagement pressure hereinafter) which can realize transition to the inertia phase without causing engine racing and torque drop. Target time T* is a time period that is required to make the transition from the output of the shift command to the start of the inertia phase when the shifting is performed using the engagement-side engagement pressure obtained by the experiments. That is, target time T* is a time period that elapses from the time at which a torque phase is terminated without deteriorating the shift feeling to the time at which the inertia phase starts. Target time setting section 23 corresponds to a first time setting section that is referred to in the claims described later, and target time T* corresponds to a first time that is referred to in the claims described later.

Gear ratio inversion time detecting section 24 detects gear ratio inversion time T that elapses from the time at which the shift command is outputted to the time at which actual gear ratio GR starts to change toward target gear ratio GR*(n) to be achieved after shifting. That is, gear ratio inversion time T is a time period from the time at which the shift command is outputted to the time at which turbine rotational number Nt actually starts to decrease. Gear ratio inversion time detecting section 24 corresponds to a second time detecting section that is referred to in the claims described later, and gear ratio inversion time T corresponds to a second time that is referred to in the claims described later.

Comparison section 25 compares lengths between target time T* and gear ratio inversion time T with each other.

Determination section 26 determines whether a deviation of gear ratio inversion time T with respect to target time T* is caused due to excess or lack of the engagement pressure in the engagement-side friction element or excess or lack of the engagement pressure in the disengagement-side friction element on the basis of a result of the detection at engine racing detecting section 22 and a result of the comparison at comparison section 25. Namely, determination section 26 determines the excess or lack of the engagement pressure in the engagement-side friction element or the excess or lack of the engagement pressure in the disengagement-side friction element on the basis of the detected occurrence or non-occurrence of engine racing and the compared lengths between target time T* and gear ratio inversion time T.

Correction section 27 conducts a learning correction of the command pressure (target engagement pressure) for the engagement-side friction element and the command pressure (target engagement pressure) for the disengagement-side friction element on the basis of a result of the determination at determination section 26, namely, on the basis of the determined excess or lack of the engagement pressure in the engagement-side friction element or excess or lack of the engagement pressure in the disengagement-side friction element.

Control unit 2 generally determines what variation occurs in either of the disengagement-side and engagement-side friction elements owing to combination of the occurrence or non-occurrence of engine racing and the long or short length relation between gear ratio inversion time T and target time T*. Control unit 2 further executes the learning correction on the basis of the results of the determination of variation occurrence.

[Flowchart]

Figure 2:
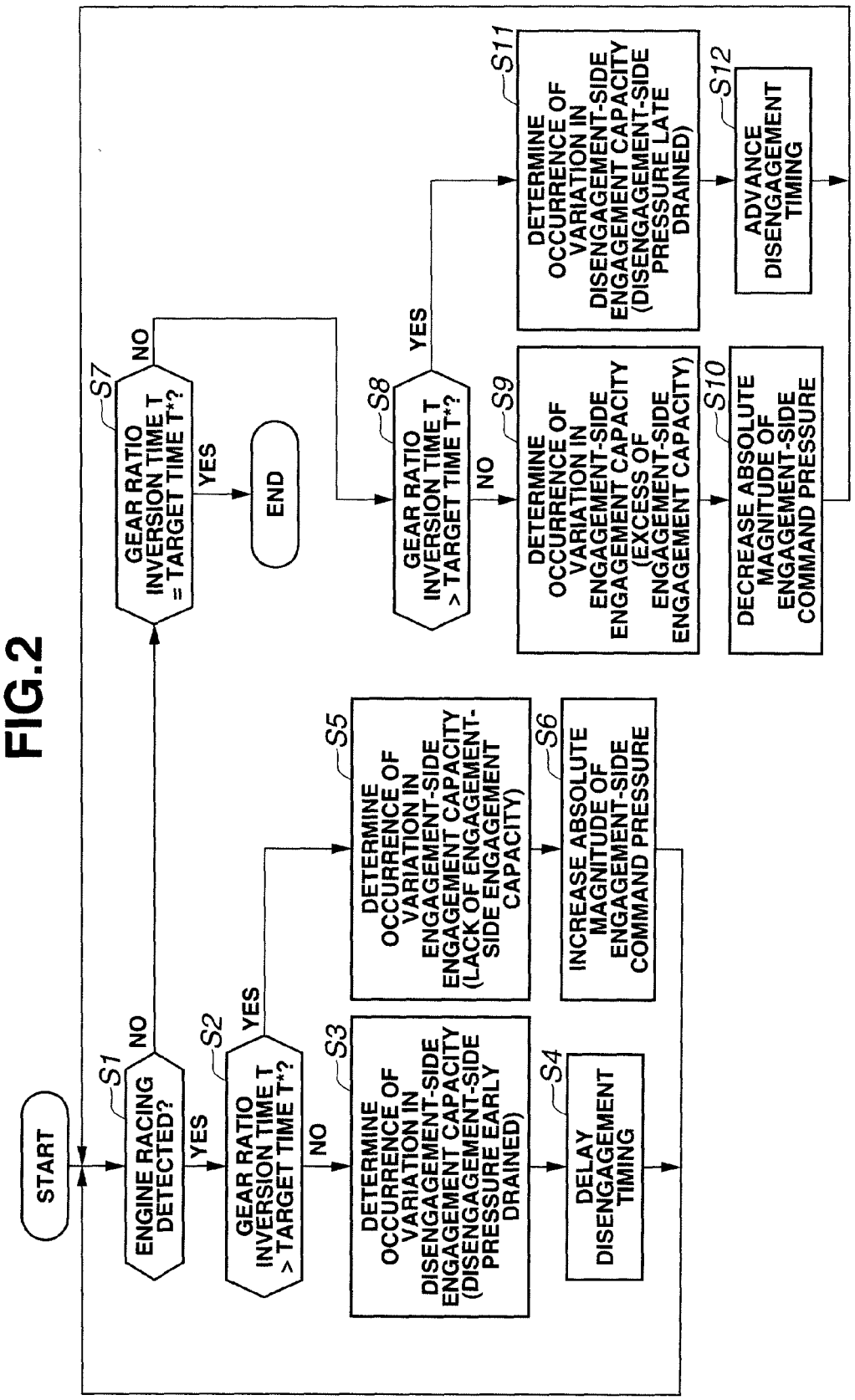
FIG. 2 is a flowchart showing a routine of the control which is carried out in the upshift control system shown in FIG. 1 when an opening of a throttle valve is an extremely small opening.
Figure 3:
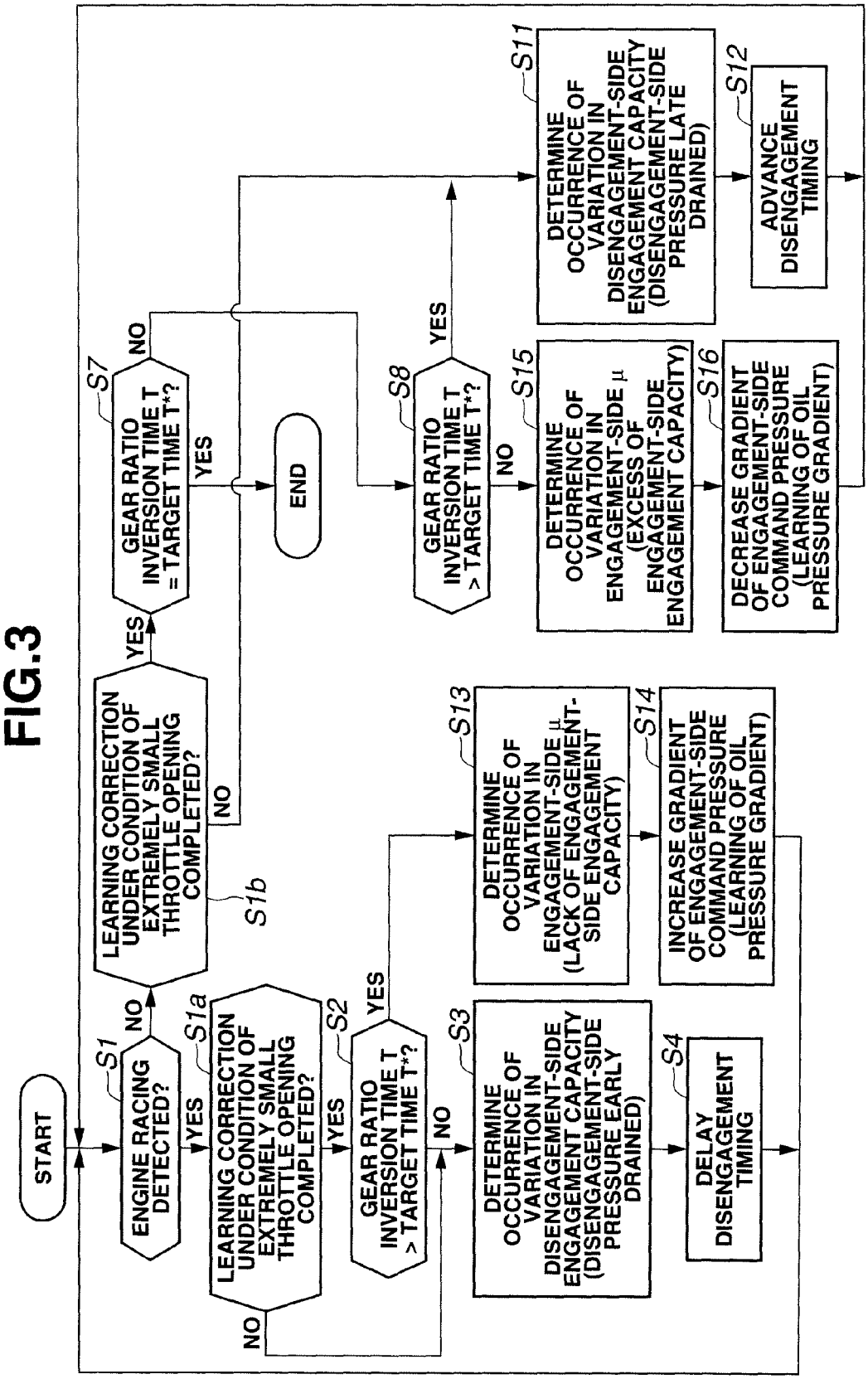
FIG. 3 is a flowchart showing a routine of the control which is carried out in the upshift control system shown in FIG. 1 when the throttle valve is a small-to-large opening.

FIGS. 2 and 3 are flowcharts showing routines of the control which are executed by control unit 2. FIG. 2 illustrates the routine of the control when the opening of the throttle valve is an extremely small opening. FIG. 3 illustrates the routine of the control when the opening of the throttle valve is a small-to-large opening. Here, the extremely small opening denotes a small opening below a predetermined opening at which variation in absolute magnitude (absolute value) of the command pressure has a larger influence on variation in engagement capacity of the friction element, as compared to variation in gradient of the command pressure. The small-to-large opening denotes an opening not less than the predetermined opening at which variation in gradient of the command pressure has a larger influence on variation in engagement capacity of the friction element, as compared to variation in absolute magnitude (absolute value) of the command pressure. The small-to-large opening not smaller than the predetermined opening. The predetermined opening may be appropriately set depending on a specification of the vehicle to which the shift control system of this embodiment is applied. For instance, the predetermined opening is below 1.5/8, at which a torque input to turbine is 120 Nm.

[Under Condition of Extremely Small Opening of Throttle Valve]

Referring to FIG. 2, a control that is executed under a condition that the opening of the throttle valve is the extremely small opening is explained.

Logic flow starts and goes to step S1 where a determination as to whether occurrence of engine racing is detected is made. When the answer to step S1 is YES, indicating that the occurrence of engine racing is detected, the logic flow proceeds to step S2 where a determination as to whether gear ratio inversion time T is longer than target time T* is made. When the answer to step S1 is NO, indicating that non-occurrence of engine racing is detected, the logic flow proceeds to step S7 where a determination as to whether or not a learning control should be ended is made as explained later. When the answer to step S2 is NO, the logic flow proceeds to step S3 and step S4 where a first learning correction for the disengagement-side friction element is performed as explained below. When the answer to step S2 is YES, the logic flow proceeds to step S5 and step S6 where a first learning correction for the engagement-side friction element is performed as explained below.

[First Learning Correction for Disengagement-side Friction Element]

On the basis of the results of the determination at steps S1 and S2, at step S3 it is determined that there occurs variation in engagement capacity of the disengagement-side friction element (referred to simply as disengagement-side engagement capacity hereinafter) and the disengagement-side engagement capacity is lacking. The reason is as follows. Engine racing occurs in a case where either the disengagement-side engagement capacity or engagement capacity of the engagement-side friction element (referred to simply as engagement-side engagement capacity hereinafter) is lacking. When the engine racing occurs, gear ratio inversion time T becomes shorter than target time T* only in a case where the engagement-side engagement capacity is sufficient (normal or slightly larger than normal). Specifically, at step S3, it is determined that a timing of decreasing the command pressure for the disengagement-side friction element, namely, a disengagement (release) timing for the disengagement-side friction element is too early. The logic flow then proceeds to step S4. At step S4, the disengagement timing for the disengagement-side friction element (referred to simply as the disengagement-side disengagement timing hereinafter) is corrected to be delayed by a predetermined time. The logic flow then returns to step S1. When it is determined that the occurrence of engine racing is not detected at step S1 and it is determined that gear ratio inversion time T is equal to target time T* at step S7 as described later, the logic flow is ended. As a result, optimization of the disengagement-side disengagement timing is ended.

[First Learning Correction for Engagement-side Friction Element]

At step S5, it is determined that there occurs variation in the engagement-side engagement capacity and the engagement-side engagement capacity is lacking. The reason is as follows. Engine racing occurs in a case where either the disengagement-side engagement capacity or the engagement-side engagement capacity is lacking. When the engine racing occurs, gear ratio inversion time T becomes longer than target time T* only in a case where the engagement-side engagement capacity is lacking. At step S5, it is also determined that the absolute magnitude (absolute value) of the engagement-side command pressure is too small at the respective instants during the shift control. The reason is as follows. When the opening of the throttle valve is the extremely small opening, the final engagement-side command pressure is small and therefore the ascending gradient of the command pressure becomes small. Accordingly, variation in the absolute magnitude of the command pressure has a larger influence on the engagement capacity, as compared to variation in the ascending gradient of the command pressure. The logic flow then proceeds to step S6. At step S6, the absolute magnitude of the engagement-side command pressure is corrected to increase by a predetermined amount. The logic flow then returns to step S1. When it is determined that the occurrence of engine racing is not detected (at step S1) and it is determined that gear ratio inversion time T is equal to target time T* (at step S7), the logic flow is ended. As a result, optimization of the engagement-side command pressure is ended. That is, a standby control for correcting variation in the engagement-side command pressure is completed.

[Determination of Ending Learning Control]

At step S7, a determination as to whether gear ratio inversion time T is equal to target time T* (T=T*) is made. When the answer to step S7 is YES, the logic flow is ended. When the answer to step S7 is NO, the logic flow then proceeds to step S8. At step S8, a determination as to whether gear ratio inversion time T is longer than target time T* (T>T*) is made. When the answer to step S8 is NO, indicating that gear ratio inversion time T is shorter than target time T* (T<T*), the logic flow proceeds to step S9 and step S10 where a second learning correction for the engagement-side friction element is performed as explained later. When the answer to step S8 is YES, indicating that gear ratio inversion time T is longer than target time T* (T>T*), the logic flow proceeds to step S11 and step S12 where a second learning correction for the disengagement-side friction element is performed as explained later.

[Second Learning Correction for Engagement-side Friction Element]

At step S9, it is determined that there occurs variation in the engagement-side engagement capacity and the engagement-side engagement capacity is excessively large. The reason is as follows. No engine racing occurs in a case where neither the disengagement-side engagement capacity nor the engagement-side engagement capacity is lacking. When no engine racing occurs, gear ratio inversion time T becomes shorter than target time T* only in a case where the engagement-side engagement capacity is excessively large. At step S9, it is also determined that the absolute magnitude (absolute value) of the engagement-side command pressure is excessively large at the respective instants during the shift control. The reason is as follows. When the opening of the throttle valve is extremely small, variation in the absolute magnitude of the command pressure has a larger influence on the engagement capacity as compared to variation in the ascending gradient of the engagement-side command pressure as explained above. The logic flow then proceeds to step S10. At step S10, the absolute magnitude of the engagement-side command pressure is corrected to decrease by a predetermined amount. The logic flow then returns to step S1. When it is determined that the occurrence of engine racing is not detected (at step S1) and it is determined that gear ratio inversion time T is equal to target time T* (at step S7), the logic flow is ended. As a result, optimization of the engagement-side command pressure is ended. That is, a standby control for correcting variation in the engagement-side command pressure is completed.

[Second Learning Correction for Disengagement-side Friction Element]

At step S11, it is determined that there occurs variation in the disengagement-side engagement capacity and the disengagement-side engagement capacity is excessively large. The reason is as follows. No engine racing occurs in a case where neither the disengagement-side engagement capacity nor the engagement-side engagement capacity is lacking. When no engine racing occurs, gear ratio inversion time T becomes longer than target time T* only in a case where the disengagement-side engagement capacity is excessively large. Specifically, at step S11, it is determined that the disengagement-side disengagement timing is too late. The logic flow then proceeds to step S12. At step S12, the disengagement-side disengagement timing is corrected to be advanced by a predetermined time. The logic flow then returns to step S1. When it is determined that the occurrence of engine racing is not detected (at step S1) and it is determined that gear ratio inversion time T is equal to target time T* (at step S7), the logic flow is ended. As a result, optimization of the disengagement-side disengagement timing is ended.

[Under Condition of Small-to-large Opening of Throttle Valve]

Next, referring to FIG. 3, a control that is executed under a condition that the opening of the throttle valve is the small-to-large opening is explained. Steps S1-S4, S7, S8, S11 and S12 in FIG. 3 are the same as those in FIG. 2, and therefore, detailed explanations therefor are omitted. When the answer to step S1 is YES, the logic flow proceeds to step S1a. When the answer to step S1 is NO, the logic flow proceeds to step S1b.

[Learning Correction for Increasing Gradient of Engagement-side Command Pressure]

At step S1a, a determination as to whether the learning correction, i.e., the standby control, in the condition of the extremely small opening of the throttle valve is completed is made. When the answer to step S1a is YES, the logic flow proceeds to step S2. When the answer to step S1a is NO, the logic flow bypasses step S2 and proceeds to step S3. Namely, as shown in the subsequent flow, if the standby control is completed, the learning correction of the ascending gradient of the engagement-side command pressure is permitted. In contrast, if the standby control is not completed, the learning correction of the ascending gradient of the engagement-side command pressure is inhibited and the disengagement-side disengagement timing is corrected to be delayed.

If the learning correction of the ascending gradient of the engagement-side command pressure is performed before the standby control is completed, it would be erroneously determined that variation in the engagement-side engagement capacity is caused due to a difference in the ascending gradient of the engagement-side command pressure, namely, a difference in friction coefficient μ of the engagement-side friction element. As a result, the ascending gradient of the engagement-side command pressure might be corrected on the basis of the erroneous determination, even though the variation in the engagement-side engagement capacity is actually caused due to a difference (offset) in the absolute magnitude (absolute value) of the engagement-side engagement pressure. That is, if the learning correction of the ascending gradient of the engagement-side command pressure is performed before completion of the standby control, the ascending gradient of the engagement-side command pressure which might be appropriate would be erroneously changed on the basis of the erroneous determination. In order to avoid such a problematic situation, in this control, the learning correction of the ascending gradient of the engagement-side command pressure is performed after the standby control is previously completed. Thus, the control can be realized with accuracy. Further, it will be difficult to make an accurate determination as to the learning correction of the ascending gradient of the engagement-side command pressure unless the standby control is completed. Therefore, a fail-safe control for correcting the disengagement-side disengagement timing is conducted (step S1a→S3→S4 or step S1b→S11→S12) until the standby control is completed. For instance, the disengagement-side disengagement timing is corrected to be delayed (step S1a→S3→S4) to thereby prevent engine racing.

At step S2, a determination as to whether gear ratio inversion time T is longer than target time T* is made. When the answer to step S2 is NO, the logic flow proceeds to step S3. When the answer to step S2 is YES, the logic flow proceeds to step S13.

At step S13, it is determined that there occurs variation in the engagement-side engagement capacity and the engagement-side engagement capacity is lacking. The reason is as follows. Engine racing occurs in a case where either the disengagement-side engagement capacity or the engagement-side engagement capacity is lacking. When the engine racing occurs, gear ratio inversion time T becomes longer than target time T* only in a case where the engagement-side engagement capacity is lacking. At step S13, it is also determined that the engagement-side friction coefficient μ is too small. The reason is as follows. When the opening of the throttle valve is the small-to-large opening, the final engagement-side command pressure is large and therefore the ascending gradient of the engagement-side command pressure becomes large. Accordingly, variation in the ascending gradient of the engagement-side command pressure has a larger influence on the engagement-side engagement capacity as compared to variation in the absolute magnitude of the engagement-side command pressure. The logic flow then proceeds to step S14.

At step S14, the ascending gradient of the engagement-side command pressure is corrected to increase by a predetermined amount. The logic flow then returns to step S1.

[Learning Correction for Decreasing Gradient of Engagement-side Command Pressure]

At step S1b, a determination as to whether the learning correction, i.e., the standby control, in the condition of the extremely small opening of the throttle valve is completed is made. When the answer to step S1b is YES, the logic flow proceeds to step S7. When the answer to step S1b is NO, the logic flow proceeds to step S11. At step S7, a determination as to whether gear ratio inversion time T is equal to target time T* is made. When the answer to step S7 is NO, the logic flow proceeds to step S8 where a determination as to whether gear ratio inversion time T is longer than target time T* is made. When the answer to step S8 is NO, the logic flow proceeds to step S15.

At step S15, it is determined that there occurs variation in the engagement-side engagement capacity and the engagement-side engagement capacity is excessively large. The reason is as follows. No engine racing occurs in a case where neither the disengagement-side engagement capacity nor the engagement-side engagement capacity is lacking. When no engine racing occurs, gear ratio inversion time T becomes shorter than target time T* only in a case where the engagement-side engagement capacity is excessively large. At step S15, it is also determined that the engagement-side friction coefficient μ is too large. The reason is as follows. When the opening of the throttle valve is the small-to-large opening, variation in the ascending gradient of the engagement-side command pressure has a larger influence on the engagement-side engagement capacity as compared to variation in the absolute magnitude of the engagement-side command pressure as explained above. The logic flow then proceeds to step S16.

At step S16, the ascending gradient of the engagement-side command pressure is corrected to decrease by a predetermined amount. The logic flow then returns to step S1.

When the answer to step S8 is YES, the logic flow proceeds to step S11 and step S12.

[Determination of Ending Learning Control]

When the answer to step S7 is YES, the logic flow is ended. That is, when it is determined that occurrence of engine racing is not detected (at step S1) and it is determined that gear ratio inversion time T is equal to target time T* (at step S7), the logic flow is ended. As a result, optimization of the engagement-side command pressure is ended, and optimization of the disengagement-side disengagement timing is ended.

[Timing Charts]

FIGS. 4A-7B are timing charts showing variation in actual gear ratio GR (turbine rotational number Nt), output torque Tout and the engagement-side and disengagement-side command pressures with respect to lapse of time which occurs during the shift control by automatic transmission controller ATCU. For the sake of simple explanation, FIGS. 4A-7B show that when twice shiftings (control cycles) are performed, variation in the disengagement-side disengagement timing and variation in the engagement-side command pressure occur as indicated by a solid line during the previous shifting (control cycle) and the variations are eliminated as indicated by a dotted line during the current shifting (control cycle). The learning control is executed by control unit 2 every shifting.

As shown in FIGS. 4A-7B, when the disengagement command for the disengagement-side friction element is outputted, the disengagement-side engagement capacity (command pressure) is decreased until the friction element is moved from the full-engagement state to the minimum-engagement state in which no slippage occurs. Subsequently, the disengagement-side engagement capacity is gradually decreased to a smaller value. After keeping the smaller value, the disengagement-side engagement capacity is further decreased until the friction element reaches the full-disengagement (full-release) state. On the other hand, when the engagement command for the engagement-side friction element is outputted, a precharge is conducted to supply a relatively high pressure to the friction element in the full-disengagement state in order to reduce a play in the pistons and the clutch plates. Subsequently, the relatively high pressure is temporarily decreased, and then the engagement-side engagement capacity (command pressure) is gradually increased to a larger value at which the friction element is not yet placed in the full-engagement state. After the engagement-side engagement capacity is kept at the larger value, the friction element is brought into the full-engagement state.

[1. Under Condition of Extremely Small Opening of Throttle Valve]

FIGS. 4A, 4B and 5A, 5B show the learning control that is conducted when the opening of the throttle valve is the extremely small opening.

[1-1. Learning Control of Disengagement Timing]

Figure 5A:
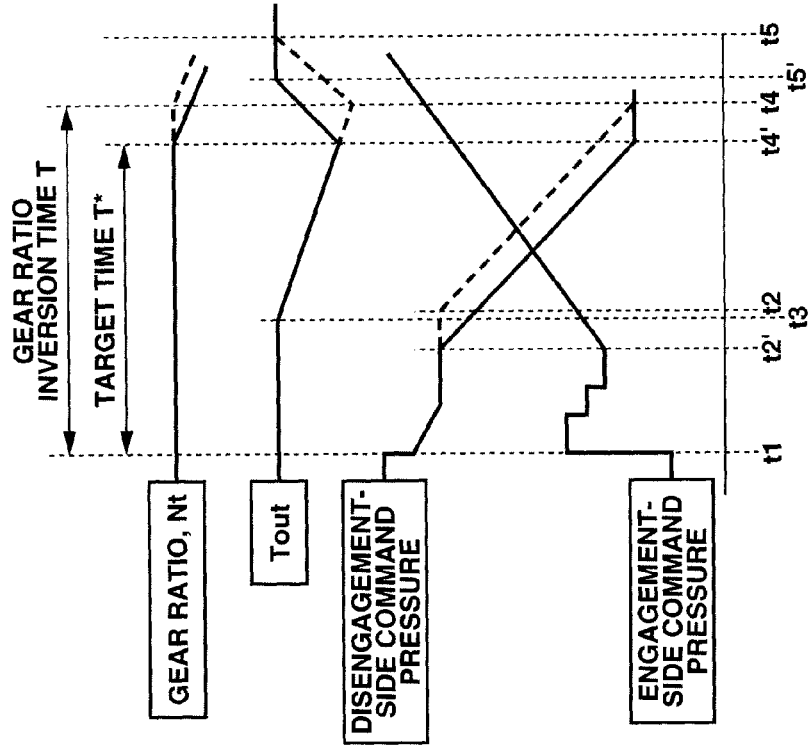
FIGS. 5A and 5B are timing charts showing a learning control of the upshift control which is carried out when interlock occurs and the opening of the throttle valve is the extremely small opening.
Figure 5B:
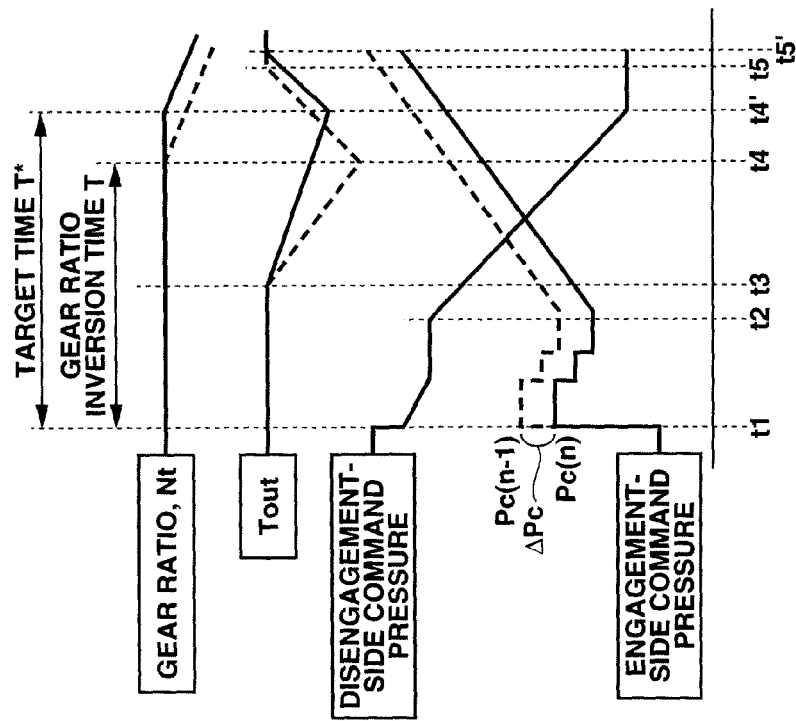

FIGS. 4A and 5B show a learning control of the timing of decreasing the disengagement-side command pressure, namely, the disengagement-side disengagement timing.

[1-1-1. Too Early Disengagement Timing]

The learning control that is conducted when gear ratio inversion time T is shorter than target time T*, namely, when the disengagement-side disengagement timing is too early, is explained with reference to FIG. 4A.

[Previous Shifting]

As shown in FIG. 4A, upon the previous shifting (control cycle), at time t1, the disengagement-side command pressure is decreased by a predetermined amount and the engagement-side command pressure is increased by a predetermined amount to thereby produce a precharge pressure.

During a time period from time t2 at which a predetermined time has elapsed from time t1, to time t4, the disengagement-side command pressure is gradually decreased at a constant rate. On the other hand, after time t2' at which a predetermined time has elapsed from time t1, the engagement-side command pressure is gradually increased at a constant rate. As a result, the shift control (changeover control) for changeover between the disengagement-side friction element and the engagement-side friction element is performed.

Generally, during the shift control (changeover control), there occurs a torque phase in which engine speed is not changed and output torque Tout only is changed. In the torque phase, the disengagement-side command pressure is decreased and the engagement-side command pressure is increased. At this time, torques in opposite directions are respectively exerted on a rotational member on the engagement-side (referred to simply as an engagement-side member hereinafter) and a rotational member on the disengagement-side (referred to simply as a disengagement-side member hereinafter), whereby a slight interlock tendency is caused. As a result, output torque Tout is slightly decreased but engine racing is prevented. Here, interlock means a phenomenon in which malfunction, such as decrease in output torque Tout, of automatic transmission AT is caused due to operating failure in the friction elements, for instance, incomplete disengagement of the friction element that must be disengaged for establishing a target gear stage. In contrast, if the engagement-side engagement capacity is not fully increased or the disengagement-side engagement capacity is excessively decreased because the disengagement-side disengagement timing is too early, the torques in the opposite directions are not exerted on the engagement-side member and the disengagement-side member to thereby cause less decrease in output torque Tout. Even if torques in the same direction which are exerted on the engagement-side member and the disengagement-side member are summed, engine racing will occur when the sum of the torques could not reach input torque Tin that is inputted from engine ENG to input shaft IN.

As shown in FIG. 4A, in the previous shifting, the disengagement-side disengagement timing is at time t2 that is earlier than time t2'. Time t2' is an ideal disengagement-side disengagement timing at which engine racing does not occur. Thus, in the previous shifting, the disengagement-side disengagement timing at time t2 is offset to be advanced relative to the ideal disengagement-side disengagement timing at time t2', whereby the disengagement-side engagement capacity becomes lacking during the shifting operation. At time t3, the sum of the engagement-side engagement capacity and the disengagement-side engagement capacity becomes less than input torque Tin. This leads to increase in turbine rotational number Nt and actual gear ratio GR to thereby cause engine racing. Further, as turbine rotational number Nt is increased, input torque Tin inputted from engine ENG to automatic transmission AT is decreased and output torque Tout also is decreased in reaction to the decrease in input torque Tin. That is, output torque Tout is decreased by an amount of the engine torque which is used in engine racing. In this regard, the decrease in output torque Tout upon occurrence of engine racing is different in cause and meaning (with or without intention) from the decrease in output torque Tout during the torque phase.

At time t4, the disengagement-side command pressure reaches an adequately small value and the engagement-side command pressure reaches a predetermined larger value, so that the sum of the disengagement-side engagement capacity and the engagement-side engagement capacity becomes not less than input torque Tin. As a result, at time t4, turbine rotational number Nt starts to decrease and actual gear ratio GR is changed from the rise to the drop. At time t4 or later, output torque Tout is increased because an inertia torque (mainly, inertia of engine ENG) corresponding to an amount of the decrease in turbine rotational number Nt is outputted to output shaft OUT. At time t5, output torque Tout returns to the value of time t3 or before.

[Current Shifting]

Next, the current shifting (control cycle) is explained with reference to FIG. 4A.

In the previous shifting, control unit 2 has determined that under a condition that engine racing occurred and gear ratio inversion time T is shorter than target time T*, the disengagement-side disengagement timing is too early and thereby engine racing is caused. Therefore, in the current shifting, control unit 2 adjusts the disengagement-side disengagement timing so as to be delayed by a predetermined time. As shown in FIG. 4A, in the current shifting, the disengagement-side command pressure starts to decrease at time t2' that is delayed from time t2 by the predetermined time. The disengagement-side command pressure is gradually decreased at a constant rate during a period from time t2' to time t4'.

At time t3' or later, a torque phase occurs. Specifically, the torques in the opposite directions are applied to the engagement-side member and the disengagement-side member to thereby produce a slight interlock tendency. As a result, output torque Tout is decreased but engine racing does not occur. The disengagement-side disengagement timing is offset from time 2 to time t2' at which the ideal timing is placed, so that the disengagement-side engagement capacity is increased to thereby prevent engine racing.

At time t4', actual gear ratio GR is changed from a constant value to the drop because the engagement-side engagement pressure is increased to a predetermined value. That is, at time t4', gear ratio inversion time T becomes equal to target time T*. Thus, variation in the disengagement-side disengagement timing can be eliminated. Further, at time t4', output torque Tout is changed from the drop to the rise because an inertia torque (mainly, inertia of engine ENG) corresponding to an amount of the decrease in actual gear ratio GR, namely, an amount of the decrease in turbine rotational number Nt, is outputted to output shaft OUT. At time t5', output torque Tout returns to the value of time t3' or before.

[1-1-2. Too Late Disengagement Timing]

The learning control that is conducted when gear ratio inversion time T is longer than target time T*, namely, when the disengagement-side disengagement timing is too late, is explained with reference to FIG. 5B.

[Previous Shifting]

In the previous shifting, during a time period from time t2 at which a predetermined time has elapsed from time t1, to time t4, the disengagement-side command pressure is gradually decreased at a constant rate. On the other hand, after time t2' at which a predetermined time has elapsed from time t1, the engagement-side command pressure is gradually increased at a constant rate.

As shown in FIG. 5B, in the previous shifting, the disengagement-side disengagement timing is at time t2 that is later than time t2'. Time t2' is an ideal disengagement-side disengagement timing at which engine racing does not occur. Thus, in the previous shifting, the disengagement-side disengagement timing at time t2 is offset to be delayed relative to the ideal disengagement-side disengagement timing at time t2'. Therefore, during a period from time t3 to time t4 wherein the torque phase occurs, output torque Tout is excessively decreased to thereby cause an intense interlock tendency. That is, in the previous shifting, time t4 when the disengagement-side engagement capacity reaches the predetermined lower limit value is offset to be delayed relative to time t4', so that the time that is elapsed before actual gear ratio GR starts to decrease is prolonged. Output torque Tout is kept decreasing during the prolonged time, namely, the period from time t4' to time t4, whereby an amount of the decrease in output torque Tout during the period from time t4' to time t4 becomes larger.

At time t4, actual gear ratio GR is changed from a constant value to the drop. This is because the engagement-side engagement capacity is increased to a predetermined value while the disengagement-side engagement capacity is decreased to an adequately small value. Further, at time t4, output torque Tout is changed from the drop to the rise, since an inertia torque corresponding to an amount of the decrease in actual gear ratio GR, namely, an amount of the decrease in turbine rotational number Nt, is outputted to output shaft OUT. At time t5, output torque Tout returns to the value of time t3 or before.

[Current Shifting]

In the previous shifting, control unit 2 has determined that under a condition that no engine racing occurs and gear ratio inversion time T is longer than target time T*, the disengagement-side disengagement timing is too late and thereby the intense interlock tendency is caused. Therefore, in the current shifting, control unit 2 adjusts the disengagement-side disengagement timing so as to be advanced by a predetermined time. As shown in FIG. 5B, in the current shifting, the disengagement-side command pressure starts to decrease at time t2' which is advanced from time t2 by the predetermined time. The disengagement-side command pressure is gradually decreased at a constant rate during a time period from time t2' to time t4'.

At time t4', actual gear ratio GR is changed from a constant value to the drop, and gear ratio inversion time T becomes equal to target time T*. Therefore, variation in the disengagement-side disengagement timing can be eliminated. That is, the torque phase is ended at time t4', and the time at which output torque Tout is changed from the drop to the rise is advanced from time t4 to time t4'. As a result, the excessive decrease in output torque Tout, i.e., the intense interlock tendency, can be prevented.

[1-2. Learning Control of Engagement-side Command Pressure]

FIG. 4B and FIG. 5A show a learning control of the engagement-side command pressure.

[1-2-1. Lack of Absolute Magnitude of Engagement-side Command Pressure]

The learning control that is conducted when gear ratio inversion time T is longer than target time T*, namely, when the absolute magnitude (absolute value) of the engagement-side command pressure is lacking, is explained with reference to FIG. 4B.

[Previous Shifting]

In the previous shifting, during a time period from time t2 at which a predetermined time has elapsed from time t1, to time t4', the disengagement-side command pressure is gradually decreased at a constant rate. On the other hand, at time t2 or later, the engagement-side command pressure is gradually increased at a constant rate. In the previous shifting, the absolute magnitude (absolute value) of the engagement-side command pressure is smaller than an ideal command pressure at which engine racing does not occur. That is, the absolute magnitude of the engagement-side command pressure is offset from the ideal command pressure toward a side of lack. Therefore, the engagement-side engagement capacity is lacking at the respective instants of shifting during the shift control. Therefore, the sum of the disengagement-side engagement capacity and the engagement-side engagement capacity becomes not less than input torque Tin. As a result, engine racing occurs at time t3 or later.

[Current Shifting]

In the previous shifting, control unit 2 has determined that under a condition that engine racing occurs and gear ratio inversion time T is longer than target time T*, the absolute magnitude of the engagement-side command pressure is lacking and thereby engine racing is caused. Therefore, in the current shifting, control unit 2 increases absolute magnitude Pc(n) of the engagement-side command pressure by predetermined amount ΔPc with respect to previous absolute magnitude Pc(n−1) of the engagement-side command pressure which was used in the previous shifting. As shown in FIG. 4B, at time t1, engagement-side command pressure Pc(n) that is larger by predetermined amount ΔPc than previous precharge pressure Pc(n−1) is outputted. During the shift control, engagement-side command pressure Pc(n) is kept at the value that is larger by predetermined amount ΔPc than previous precharge pressure Pc(n−1).

At time t3' or later, the torque phase occurs. Therefore, output torque Tout is decreased and engine racing does not occur. At time t4', actual gear ratio GR is changed from a constant value to the drop, since the engagement-side command pressure is increased to a predetermined value. As a result, at time t4', gear ratio inversion time T becomes equal to target time T*, and variation in the absolute magnitude of the engagement-side command pressure can be eliminated. At time t4', output torque Tout is changed from the drop to the rise. At time t5', output torque Tout returns to the value of time t3' or before.

[1-2-2. Excess of Absolute Magnitude of Engagement-side Command Pressure]

The learning control that is conducted when gear ratio inversion time T is shorter than target time T*, namely, when the absolute magnitude (absolute value) of the engagement-side command pressure is excessively large, is explained with reference to FIG. 5A.

[Previous Shifting]

In the previous shifting, during a time period from time t2 at which a predetermined time has elapsed from time t1, to time t4', the disengagement-side command pressure is gradually decreased at a constant rate. On the other hand, at time t2 or later, the engagement-side command pressure is gradually increased at a constant rate.

In the previous shifting, the absolute magnitude of the engagement-side command pressure is larger than an ideal command pressure at which engine racing is not caused. That is, the absolute magnitude of the engagement-side command pressure is offset from the ideal command pressure toward a side of excess. Therefore, during a period from time t3 to time t4 wherein the torque phase occurs, output torque Tout is excessively decreased to thereby cause the intense interlock tendency. At the respective instants during the shift control, the engagement-side engagement capacity is excessively large and the disengagement-side engagement capacity is kept large. This causes an increase in difference between the torques which are exerted on the engagement-side member and the disengagement-side member in mutually opposite directions. As a result, a rate of decrease in output torque Tout is enhanced, thereby causing rapid decrease in output torque Tout. At time t4, actual gear ratio GR is changed from a constant value to the drop. At time t4, output torque Tout is changed from the drop to the rise.

[Current Shifting]

In the previous shifting, control unit 2 has determined that under a condition that no engine racing occurs and gear ratio inversion time T is shorter than target time T*, the absolute magnitude of the engagement-side command pressure is excessively large and thereby the intense interlock tendency is caused. Therefore, in the current shifting, control unit 2 decreases absolute magnitude Pc(n) of the engagement-side command pressure by predetermined amount ΔPc with respect to previous absolute magnitude Pc(n−1) of the engagement-side command pressure which was used in the previous shifting. As shown in FIG. 5A, at time t1, engagement-side command pressure Pc(n) that is smaller by predetermined amount ΔPc than previous precharge pressure Pc(n−1) is outputted. During the shift control, engagement-side command pressure Pc(n) is kept at the value that is smaller by predetermined amount ΔPc than previous precharge pressure Pc(n−1).

At time t3 or later, the torque phase occurs. The engagement-side engagement capacity is optimally retained at the respective instants during the shift control, so that the rate of decrease in output torque Tout is optimally kept. As a result, the rapid decrease in output torque Tout, namely, the intense interlock tendency, can be suppressed. At time t4', actual gear ratio GR is changed from a constant value to the drop, since the engagement-side command pressure is increased to a predetermined value. As a result, at time t4', gear ratio inversion time T becomes equal to target time T*, and variation in the absolute magnitude of the engagement-side command pressure can be eliminated. At time t4', output torque Tout is changed from the drop to the rise.

[2. Under Condition of Small-to-large Opening of Throttle Valve]

FIGS. 6A, 6B and 7A, 7B show the learning control that is conducted when the opening of the throttle valve is the small-to-large opening.

[2-1. Learning Control of Disengagement Timing]

FIGS. 6A and 7B show a learning control of the disengagement-side disengagement timing. The learning control of the disengagement-side disengagement timing which is conducted in the condition of the small-to-large opening of the throttle valve is the same as the learning control of the disengagement-side disengagement timing which is conducted in the condition of the extremely small opening of the throttle valve as shown in FIGS. 4A and 5B.

[2-2. Learning Control of Engagement-side Command Pressure]

FIGS. 6B and 7A show a learning control of the engagement-side command pressure.

[2-2-1. Lack of Gradient of Engagement-side Command Pressure]

The learning control that is conducted when gear ratio inversion time T is longer than target time T*, namely, when the ascending gradient of the engagement-side command pressure is lacking, is explained with reference to FIG. 6B.

[Previous Shifting]

In the previous shifting, the ascending gradient of the engagement-side command pressure is smaller than an ideal gradient thereof at which engine racing does not occur. That is, the ascending gradient of the engagement-side command pressure is offset from the ideal gradient toward a side of lack. Therefore, the engagement-side engagement capacity is lacking at the respective instants during the shift control. As a result, engine racing occurs at time t3 or later when the sum of the disengagement-side engagement capacity and the engagement-side engagement capacity is less than input torque Tin. Similar to FIG. 4B, the disengagement-side engagement capacity is gradually decreased at a constant rate during the period from time t2 to time t4'.

[Current Shifting]

In the previous shifting, control unit 2 has determined that under a condition that engine racing occurs and gear ratio inversion time T is longer than target time T*, the ascending gradient of the engagement-side command pressure is lacking and thereby engine racing is caused. Therefore, in the current shifting, control unit 2 increases ascending gradient dPc(n)/dt of the engagement-side command pressure by a predetermined value with respect to previous ascending gradient dPc(n−1)/dt of the engagement-side command pressure which was used in the previous shifting. As shown in FIG. 6B, at time t2 or later, the engagement-side command pressure is outputted at ascending gradient dPc(n)/dt that is larger by the predetermined value than previous ascending gradient dPc(n−1)/dt.

At time t3' or later, the torque phase occurs. Therefore, output torque Tout is decreased and engine racing does not occur. At time t4', actual gear ratio GR starts to decrease from a constant value. As a result, at time t4', gear ratio inversion time T becomes equal to target time T*, and variation in the ascending gradient of the engagement-side command pressure (variation in the engagement-side friction coefficient μ) can be eliminated. At time t4', output torque Tout is changed from the drop to the rise. At time t5', output torque Tout returns to the value of time t3' or before.

[2-2-2. Excess of Gradient of Engagement-side Command Pressure]

The learning control that is conducted when gear ratio inversion time T is shorter than target time T*, namely, when the ascending gradient of the engagement-side command pressure is excessively large, is explained with reference to FIG. 7A.

[Previous Shifting]

In the previous shifting, the ascending gradient of the engagement-side command pressure is larger than an ideal gradient thereof at which engine racing does not occur. That is, the ascending gradient of the engagement-side command pressure is offset from the ideal gradient toward a side of excess. Therefore, during a time period from time t3 to time t4 wherein the torque phase occurs, output torque Tout is excessively decreased to thereby cause the intense interlock tendency. At the respective instants during the shift control, the engagement-side engagement capacity is excessively large and the disengagement-side engagement capacity is kept large. This causes an increase in difference between the torques which are exerted on the engagement-side member and the disengagement-side member in mutually opposite directions. As a result, a rate of decrease in output torque Tout is enhanced, thereby causing rapid decrease in output torque Tout. At time t4, actual gear ratio GR is changed from a constant value to the drop. At time t4, output torque Tout is changed from the drop to the rise.

[Current Shifting]

In the previous shifting, control unit 2 has determined that under a condition that no engine racing occurs and gear ratio inversion time T is shorter than target time T*, the ascending gradient of the engagement-side command pressure is excessively large and thereby the intense interlock tendency is caused. Therefore, in the current shifting, control unit 2 decreases ascending gradient dPc(n)/dt of the engagement-side command pressure by a predetermined value with respect to previous ascending gradient dPc(n−1)/dt of the engagement-side command pressure which was used in the previous shifting. As shown in FIG. 7A, at time t2 or later, the engagement-side command pressure is outputted at ascending gradient dPc(n)/dt that is smaller by the predetermined value than previous ascending gradient dpc(n−1)/dt.

At time t3 or later, the torque phase occurs. The engagement-side engagement capacity is optimally retained at the respective instants during the shift control, so that the rate of decrease in output torque Tout is optimally kept. As a result, the rapid decrease in output torque Tout, namely, the intense interlock tendency, can be suppressed. At time t4', actual gear ratio GR is changed from a constant value to the drop. As a result, at time t4', gear ratio inversion time T becomes equal to target time T*, and variation in the ascending gradient of the engagement-side command pressure can be eliminated. At time t4', output torque Tout is changed from the drop to the rise.

[Function and Effect of Embodiment]

The upshift control system of the embodiment of the present invention can perform the following functions and effects.

The upshift control system of the embodiment can determine variation in the engagement-side engagement capacity or variation in the disengagement-side engagement capacity on the basis of combination of the occurrence or non-occurrence of engine racing and the long or short length relation between gear ratio inversion time T and target time T*. Specifically, target time T* which can realize transition to the inertia phase without deteriorating a shift feeling is set, and the length relation between target time T* and gear ratio inversion time T which is elapsed until actual gear ratio GR starts to decrease is detected. Further, on the basis of combination of the occurrence or non-occurrence of engine racing and the long or short length relation between gear ratio inversion time T and target time T*, variation in the engagement-side engagement capacity or variation in the disengagement-side engagement capacity can be determined. As a result, it can be generally and more practically determined what variation occurs in either of the disengagement-side and engagement-side friction elements. Further, by conducting the learning correction depending on the results of the determination, shift timing control can be precisely executed. Furthermore, the determination of variation in the engagement-side engagement capacity or variation in the disengagement-side engagement capacity is conducted on the basis of magnitude of the opening of the throttle valve. As a result, it is possible to perform more accurate determination and learning correction by considering variation in the engagement-side friction coefficient μ with elapsed time.

Control unit 2 of the embodiment has the following effects.

(1) Control unit 2 determines variation in engagement capacity of the engagement-side friction element or variation in engagement capacity of the disengagement-side friction element on the basis of the occurrence or non-occurrence of engine racing and the long or short length relation between target time T* and gear ratio inversion time T. Therefore, control unit 2 can generally and more practically determine what variation in engagement capacity of either the engagement-side friction element or the disengagement-side friction element occurs. Further, by performing the learning correction depending on the results of the determination, control unit 2 can execute precise shift timing control. Accordingly, the upshift control system of the embodiment can prevent occurrence of engine racing and torque drop shock at an initial stage, i.e., torque phase, of upshift control. Further, since it is not necessary to use a one-way clutch or a hydraulic switch in order to prevent such an occurrence of engine racing and torque drop shock, the upshift control system of the embodiment can be downsized and can ensure a stable shift feeling.

(2) When the opening of the throttle valve is the extremely small opening, determination section 26 of control unit 2 determines excess or lack of the engagement capacity of the engagement-side friction element by excess or lack of the engagement pressure in the engagement-side friction element. In other words, under a condition that the opening of the throttle valve is the extremely small opening, determination section 26 determines that the excess or lack of the engagement capacity of the engagement-side friction element is caused due to the excess or lack of the engagement pressure in the engagement-side friction element.

Specifically, when the opening of the throttle valve is the extremely small opening, variation in absolute magnitude (absolute value) of the command pressure has a larger influence on variation in engagement capacity than variation in gradient of the command pressure. Therefore, when the engagement-side engagement capacity is excessively large or lacking, it can be determined that the engagement-side engagement pressure is excessively large or lacking.

(3) Determination section 26 determines that the disengagement-side engagement pressure is lacking under a condition that occurrence of engine racing is detected and gear ratio inversion time T is shorter than target time T*. Determination section 26 also determines that the engagement-side engagement pressure is lacking under a condition that occurrence of engine racing is detected, gear ratio inversion time T is longer than target time T*, and the opening of the throttle valve is the extremely small opening.

Engine racing occurs in a case where either the disengagement-side engagement capacity or the engagement-side engagement capacity is lacking. When the engine racing occurs, gear ratio inversion time T becomes shorter than target time T* only in a case where the engagement-side engagement capacity is sufficient (normal or slightly larger than normal). As a result, in the above condition of T<T* with engine racing, it can be determined that the disengagement-side engagement pressure is lacking. Specifically, it can be determined that since the disengagement-side disengagement timing is too early, the disengagement-side engagement pressure is lacking. On the other hand, when the engine racing occurs, gear ratio inversion time T becomes longer than target time T* only in a case where the engagement-side engagement capacity is lacking. As a result, in the above condition of T>T* with engine racing, it can be determined that the engagement-side engagement pressure is lacking. Here, as explained in paragraph (2) regarding the function of determination section 26, it can be determined that the absolute magnitude of the engagement-side command pressure is lacking when the opening of the throttle valve is the extremely small opening.

(4) Correction section 27 performs the learning correction by increasing the engagement-side command pressure, when it is determined that the engagement-side engagement pressure is lacking.

By performing the learning correction depending on the results of the determination at determination section 26, shift timing control can be performed with precision.

(5) Determination section 26 determines that the engagement-side engagement pressure is excessively large under a condition that non-occurrence of engine racing is detected, gear ratio inversion time T is shorter than target time T* and the opening of the throttle valve is the extremely small opening. Determination section 26 also determines that the disengagement-side engagement pressure is excessively large under a condition that non-occurrence of engine racing is detected and gear ratio inversion time T is longer than target time T*.

Specifically, no engine racing occurs in a case where neither the disengagement-side engagement capacity nor the engagement-side engagement capacity is lacking. When no engine racing occurs, gear ratio inversion time T becomes shorter than target time T* only in a case where the engagement-side engagement capacity is excessively large. As a result, in the condition of T<T* without engine racing, it can be determined that the engagement-side engagement pressure is excessively large. Here, as explained in paragraph (2) regarding the function of determination section 26, it can be determined that the absolute magnitude of the engagement-side command pressure is excessively large when the opening of the throttle valve is the extremely small opening. On the other hand, when no engine racing occurs, gear ratio inversion time T becomes longer than target time T* only in a case where the disengagement-side engagement capacity is excessively large. As a result, in the condition of T>T* without engine racing, it can be determined that the disengagement-side engagement pressure is excessively large. Specifically, it can be determined that since the disengagement-side disengagement timing is too late, the disengagement-side engagement pressure is excessively large.

(6) Correction section 27 performs the learning correction by decreasing the engagement-side command pressure, when it is determined that the engagement-side engagement pressure is excessively large.

By performing the learning correction depending on the results of the determination at determination section 26, shift timing control can be performed with precision.

(7) Determination section 26 determines excess or lack of the engagement-side engagement capacity by excess or lack of friction coefficient $\mu$ of the engagement-side friction element in a condition of the small-to-large opening of the throttle valve. In other words, determination section 26 determines that the excess or lack of the engagement-side engagement capacity is caused due to the excess or lack of friction coefficient $\mu$ of the engagement-side friction element in the condition of the small-to-large opening of the throttle valve.

Specifically, when the opening of the throttle valve is the small-to-large opening, variation in gradient of the command pressure has a larger influence on variation in engagement capacity than variation in absolute magnitude (absolute value) of the command pressure. Therefore, when the engagement-side engagement capacity is excessively large or lacking, it can be determined that friction coefficient $\mu$ of the engagement-side friction element is excessively large or lacking.

(8) Correction section 27 performs the learning correction by increasing the gradient of the engagement-side command pressure, when it is determined that friction coefficient $\mu$ of the engagement-side friction element is lacking.

By performing the learning correction depending on the results of the determination at determination section 26, shift timing control can be performed with precision.

(9) Correction section 27 performs the learning correction by decreasing the gradient of the engagement-side command pressure, when it is determined that friction coefficient $\mu$ of the engagement-side friction element is excessively large.

By performing the learning correction depending on the results of the determination at determination section 26, shift timing control can be performed with precision.

(10) Correction section 27 performs the learning correction of the gradient of the engagement-side command pressure after completion of the learning correction (standby control) of the engagement-side command pressure in a condition of the extremely small opening of the throttle valve.

Specifically, in a case where the learning correction of the ascending gradient of the engagement-side command pressure is carried out before completion of the standby control, the ascending gradient of the engagement-side command pressure which might be appropriate would be erroneously changed. Therefore, the learning correction of the ascending gradient of the engagement-side command pressure is conducted after the standby control is previously completed. As a result, the shift control can be realized with accuracy.

(11) Determination section 26 determines whether or not the learning correction (standby control) of the engagement-side command pressure in a condition of the extremely small opening of the throttle valve is completed in a case where occurrence of engine racing is detected and the opening of the throttle valve is the small-to-large opening. Determination section 26 further determines that friction coefficient μ of the engagement-side friction element is lacking in a case where the standby control is completed and gear ratio inversion time T is longer than target time T*. Determination section 26 further determines that the disengagement-side engagement capacity is lacking in a case where the standby control is completed and gear ratio inversion time T is shorter than target time T*. On the other hand, determination section 26 determines that the disengagement-side engagement capacity is lacking in a case where the standby control is not completed. In this case, correction section 27 delays the disengagement-side disengagement timing.

Specifically, engine racing occurs in a case where either the disengagement-side engagement capacity or the engagement-side engagement capacity is lacking. When the engine racing occurs, gear ratio inversion time T becomes longer than target time T* only in a case where the engagement-side engagement capacity is lacking. As a result, in the condition of T>T* with engine racing, it can be determined that the engagement-side engagement pressure is lacking. Here, as explained in paragraph (7) regarding the function of determination section 26, it can be determined that friction coefficient μ of the engagement-side friction element is lacking when the opening of the throttle valve is the small-to-large opening. On the other hand, when engine racing occurs, the gear ratio inversion time T becomes shorter than target time T* only in a case where the engagement-side engagement capacity is sufficient (normal or slightly larger than normal). As a result, in the condition of T<T* with engine racing, it can be determined that the disengagement-side engagement pressure is lacking. Specifically, it can be determined that since the disengagement-side disengagement timing is too early, the disengagement-side engagement pressure is lacking. Here, as described in paragraph (10) regarding the function of correction section 27, the learning correction of the ascending gradient of the engagement-side command pressure is performed after previous completion of the standby control. Accordingly, it is possible to realize an accurate control without erroneously determining that variation in the engagement-side engagement capacity which is caused due to a difference (offset) in absolute magnitude (absolute value) of the engagement pressure is caused due to a difference in the ascending gradient of the engagement-side command pressure (difference in the engagement-side friction coefficient μ). On the other hand, a fail-safe control for correcting the disengagement-side disengagement timing is conducted until the standby control is completed. Accordingly, it is possible to prevent unnecessary control of the engagement-side engagement pressure on the basis of the erroneous determination. Occurrence of at least engine racing can be suppressed by delaying the disengagement-side disengagement timing as described above.

(12) Determination section 26 determines whether or not the standby control that is conducted in a condition of the extremely small opening of the throttle valve is completed in a case where non-occurrence of engine racing is detected and the opening of the throttle valve is the small-to-large opening. Determination section 26 further determines that the disengagement-side engagement capacity is excessively large in a case where the standby control is completed and gear ratio inversion time T is longer than target time T*. Determination section 26 further determines that friction coefficient μ of the engagement-side friction element is excessively large in a case where the standby control is completed and gear ratio inversion time T is shorter than target time T*. On the other hand, determination section 26 determines that the disengagement-side engagement capacity is excessively large in a case where the standby control is not completed. In this case, correction section 27 advances the disengagement-side disengagement timing.

Specifically, no engine racing occurs in a case where neither the disengagement-side engagement capacity nor the engagement-side engagement capacity is lacking. When no engine racing occurs, gear ratio inversion time T becomes longer than target time T* only in a case where the disengagement-side engagement capacity is excessively large. As a result, in the condition of T>T* without engine racing, it can be determined that the disengagement-side engagement pressure is excessively large. Specifically, it can be determined that since the disengagement-side disengagement timing is too late, the disengagement-side engagement pressure is excessively large. On the other hand, when no engine racing occurs, gear ratio inversion time T becomes shorter than target time T* only in a case where the engagement-side engagement capacity is excessively large. As a result, in the condition of T<T* without engine racing, it can be determined that the engagement-side engagement pressure is excessively large. Here, as described in paragraph (7) regarding the function of determination section 26, it can be determined that friction coefficient μ of the engagement-side friction element is excessively large when the opening of the throttle valve is the small-to-large opening. Here, as described in paragraph (10) regarding the function of correction section 27, the learning correction of the ascending gradient of the engagement-side command pressure is performed after previous completion of the standby control as discussed above. Accordingly, it is possible to realize accurate control without erroneously determining that variation in the engagement-side engagement capacity which is caused due to a difference (offset) in absolute magnitude (absolute value) of the engagement pressure is caused due to a difference in the ascending gradient of the engagement-side command pressure (difference in the engagement-side friction coefficient μ). On the other hand, a fail-safe control for correcting the disengagement-side disengagement timing is conducted until the standby control is completed. Accordingly, it is possible to prevent unnecessary control of the engagement-side engagement pressure on the basis of the erroneous determination. Occurrence of at least interlock can be suppressed by advancing the disengagement-side disengagement timing as described above.

This application is based on a prior Japanese Patent Application No. 2006-302175 filed on Nov. 8, 2006. The entire contents of the Japanese Patent Application No. 2006-302175 is hereby incorporated by reference.

Although the present invention has been described above by reference to a certain embodiment of the present invention, the present invention is not limited to the embodiment described above. Modifications and variations of the embodiment described above will occur to those skilled in the art in light of the above teachings. The scope of the present invention is defined with reference to the following claims.

What is claimed is:

1. An upshift control system for use in an automatic transmission that is configured to perform shifting of a gear ratio in response to an output of a shift command, the automatic transmission including a first friction element and a second friction element and achieving a target gear ratio by engaging the first friction element and disengaging the second friction element, the upshift control system controlling an engagement capacity of the first friction element and an engagement capacity of the second friction element, the upshift control system comprising:

a gear ratio detecting section that detects an actual gear ratio of the automatic transmission;

an engine racing detecting section that detects occurrence or non-occurrence of engine racing by comparing the actual gear ratio of the automatic transmission with a target gear ratio that is set before the shifting;

a first time setting section that sets a first time as a target time which elapses from the output of the shift command to a start of an inertia phase;

a second time detecting section that detects a second time that elapses from the output of the shift command to a start of change in the actual gear ratio toward a target gear ratio to be achieved after the shifting;

a comparison section that compares lengths between the first time and the second time;

a determination section that determines excess or lack of the engagement capacity of the first friction element or excess or lack of the engagement capacity of the second friction element on the basis of the detected occurrence or non-occurrence of engine racing and the compared lengths between the first time and the second time; and a correction section that performs a learning correction of a command pressure for the first friction element or a command pressure for the second friction element on the basis of the determined excess or lack of the engagement capacity of the first friction element or excess or lack of the engagement capacity of the second friction element.

2. The upshift control system as claimed in claim 1, further comprising a sensor that senses an opening of a throttle valve, wherein when the opening of the throttle valve is below a predetermined opening, the determination section determines the excess or lack of the engagement capacity of the first friction element by excess or lack of an engagement pressure in the first friction element.

3. The upshift control system as claimed in claim 2, wherein the determination section determines that the engagement capacity of the second friction element is lacking in a case where the occurrence of engine racing is detected and the second time is shorter than the first time, and the determination section determines that the engagement pressure in the first friction element is lacking in a case where the occurrence of engine racing is detected, the second time is longer than the first time, and the opening of the throttle valve is below the predetermined opening.

4. The upshift control system as claimed in claim 2, wherein when it is determined that the engagement pressure in the first friction element is lacking, the correction section performs a command pressure learning correction by increasing the command pressure for the first friction element.

5. The upshift control system as claimed in claim 2, wherein the determination section determines that the engagement pressure in the first friction element is excessively large in a case where the non-occurrence of engine racing is detected, the second time is shorter than the first time, and the opening of the throttle valve is below the predetermined opening, and the determination section determines that the engagement capacity of the second friction element is excessively large in a case where the non-occurrence of engine racing is detected and the second time is longer than the first time.

6. The upshift control system as claimed in claim 2, wherein when it is determined that the engagement pressure in the first friction element is excessively large, the correction section performs a command pressure learning correction by decreasing the command pressure for the first friction element.

7. The upshift control system as claimed in claim 4, wherein when the opening of the throttle valve is not smaller than the predetermined opening, the determination section determines the excess or lack of the engagement capacity of the first friction element by excess or lack of friction coefficient of the first friction element.

8. The upshift control system as claimed in claim 7, wherein when it is determined that the friction coefficient of the first friction element is lacking, the correction section performs a gradient learning correction by increasing a gradient of the command pressure for the first friction element.

9. The upshift control system as claimed in claim 7, wherein when it is determined that the friction coefficient of the first friction element is excessively large, the correction section performs a gradient learning correction by decreasing a gradient of the command pressure for the first friction element.

10. The upshift control system as claimed in claim 8, wherein the correction section performs the gradient learning correction after completion of the command pressure learning correction.

11. The upshift control system as claimed in claim 9, wherein the correction section performs the gradient learning correction after completion of the command pressure learning correction.

12. The upshift control system as claimed in claim 10, wherein the determination section determines whether the command pressure learning correction is completed in a case where the occurrence of engine racing is detected and the opening of the throttle valve is not smaller than the predetermined opening, when it is determined that the command pressure learning correction is completed and the second time is longer than the first time, the determination section determines that the friction coefficient of the first friction element is lacking, when it is determined that the command pressure learning correction is completed and the second time is shorter than the first time, the determination section determines that the engagement capacity of the second friction element is lacking, and when it is determined that the command pressure learning correction is not completed, the correction section delays a disengagement timing for the second friction element.

13. The upshift control system as claimed in claim 10, wherein the determination section determines whether the command pressure learning correction is completed in a case where the non-occurrence of engine racing is detected and the opening of the throttle valve is not smaller than the predetermined opening, when it is determined that the command pressure learning correction is completed and the second time is longer than the first time, the determination section determines that the engagement capacity of the second friction element is excessively large, when it is determined that the command pressure learning correction is completed and the second time is shorter than the first time, the determination section determines that the friction coefficient of the first friction element is excessively large, and when it is determined that the command pressure learning correction is not completed, the correction section advances a disengagement timing for the second friction element.

14. The upshift control system as claimed in claim 12, wherein the determination section determines whether the command pressure learning correction is completed in a case where the occurrence of engine racing is detected and the opening of the throttle valve is not smaller than the predetermined opening, when it is determined that the command pressure learning correction is completed and the second time is longer than the first time, the determination section determines that the friction coefficient of the first friction element is lacking, when it is determined that the command pressure learning correction is completed and the second time is shorter than the first time, the determination section determines that the engagement capacity of the second friction element is lacking, and when it is determined that the command pressure learning correction is not completed, the correction section delays a disengagement timing for the second friction element.

15. The upshift control system as claimed in claim 11, wherein the determination section determines whether the command pressure learning correction is completed in a case where the non-occurrence of engine racing is detected and the opening of the throttle valve is not smaller than the predetermined opening, when it is determined that the command pressure learning correction is completed and the second time is longer than the first time, the determination section determines that the engagement capacity of the second friction element is excessively large, when it is determined that the command pressure learning correction is completed and the second time is shorter than the first time, the determination section determines that the friction coefficient of the first friction element is excessively large, and when it is determined that the command pressure learning correction is not completed, the correction section advances a disengagement timing for the second friction element.

16. The upshift control system as claimed in claim 6, wherein when the opening of the throttle valve is not smaller than the predetermined opening, the determination section determines the excess or lack of the engagement capacity of the first friction element by excess or lack of friction coefficient of the first friction element.

17. The upshift control system as claimed in claim 16, wherein when it is determined that the friction coefficient of the first friction element is lacking, the correction section performs a gradient learning correction by increasing a gradient of the command pressure for the first friction element.

18. The upshift control system as claimed in claim 16, wherein when it is determined that the friction coefficient of the first friction element is excessively large, the correction section performs a gradient learning correction by decreasing a gradient of the command pressure for the first friction element.

19. The upshift control system as claimed in claim 17, wherein the correction section performs the gradient learning correction after completion of the command pressure learning correction.

20. The upshift control system as claimed in claim 18, wherein the correction section performs the gradient learning correction after completion of the command pressure learning correction.

21. The upshift control system as claimed in claim 19, wherein the determination section determines whether the command pressure learning correction is completed in a case where the occurrence of engine racing is detected and the opening of the throttle valve is not smaller than the predetermined opening, when it is determined that the command pressure learning correction is completed and the second time is longer than the first time, the determination section determines that the friction coefficient of the first friction element is lacking, when it is determined that the command pressure learning correction is completed and the second time is shorter than the first time, the determination section determines that the engagement capacity of the second friction element is lacking, and when it is determined that the command pressure learning correction is not completed, the correction section delays a disengagement timing for the second friction element.

22. The upshift control system as claimed in claim 19, wherein the determination section determines whether the command pressure learning correction is completed in a case where the non-occurrence of engine racing is detected and the opening of the throttle valve is not smaller than the predetermined opening, when it is determined that the command pressure learning correction is completed and the second time is longer than the first time, the determination section determines that the engagement capacity of the second friction element is excessively large, when it is determined that the command pressure learning correction is completed and the second time is shorter than the first time, the determination section determines that the friction coefficient of the first friction element is excessively large, and when it is determined that the command pressure learning correction is not completed, the correction section advances a disengagement timing for the second friction element.

23. The upshift control system as claimed in claim 20, wherein the determination section determines whether the command pressure learning correction is completed in a case where the occurrence of engine racing is detected and the opening of the throttle valve is not smaller than the predetermined opening, when it is determined that the command pressure learning correction is completed and the second time is longer than the first time, the determination section determines that the friction coefficient of the first friction element is lacking, when it is determined that the command pressure learning correction is completed and the second time is shorter than the first time, the determination section determines that the engagement capacity of the second friction element is lacking, and when it is determined that the command pressure learning correction is not completed, the correction section delays a disengagement timing for the second friction element.

24. The upshift control system as claimed in claim 20, wherein the determination section further determines whether the command pressure learning correction is completed in a case where the non-occurrence of engine racing is detected and the opening of the throttle valve is not smaller than the predetermined opening, when it is determined that the command pressure learning correction is completed and the second time is longer than the first time, the determination section determines that the engagement capacity of the second friction element is excessively large, when it is determined that the command pressure learning correction is completed and the second time is shorter than the first time, the determination section determines that the friction coefficient of the first friction element is excessively large, and when it is determined that the command pressure learning correction is not completed, the correction section advances a disengagement timing for the second friction element.

25. An upshift control method for an automatic transmission that is configured to perform shifting of a gear ratio in response to an output of a shift command, the automatic transmission including a first friction element and a second friction element and achieving a target gear ratio by engaging the first friction element and disengaging the second friction element, the upshift control method controlling an engagement capacity of the first friction element and an engagement capacity of the second friction element, the upshift control method comprising:

detecting an actual gear ratio of the automatic transmission;

detecting occurrence or non-occurrence of engine racing by comparing the actual gear ratio of the automatic transmission with a target gear ratio that is set before the shifting;

setting a first time as a target time which elapses from the output of the shift command to start of an inertia phase;

detecting a second time that elapses from the output of the shift command to a start of variation in the actual gear ratio toward a target gear ratio to be achieved after the shifting;

comparing lengths between the first time and the second time;

determining excess or lack of the engagement capacity of the first friction element or excess or lack of the engagement capacity of the second friction element on the basis of the detected occurrence or non-occurrence of engine racing and the compared lengths between the first time and the second time; and performing a learning correction of a command pressure for the first friction element or a command pressure for the second friction element on the basis of the determined excess or lack of the engagement capacity of the first friction element or excess or lack of the engagement capacity of the second friction element.

* * * * *